United States Patent

Häbich et al.

[11] 4,320,181
[45] Mar. 16, 1982

[54] NON-GASSING STORAGE BATTERY

[75] Inventors: Andreas Häbich; Josef Arnold, both of Gerlingen, Fed. Rep. of Germany

[73] Assignee: Robert Bosch GmbH, Stuttgart, Fed. Rep. of Germany

[21] Appl. No.: 181,687

[22] Filed: Aug. 27, 1980

[30] Foreign Application Priority Data

Sep. 1, 1979 [DE] Fed. Rep. of Germany ....... 2935363

[51] Int. Cl.³ .......................................... H01M 10/34
[52] U.S. Cl. ....................................... 429/59; 429/57; 429/252; 429/253; 429/254
[58] Field of Search ..................... 429/59, 60, 57, 251, 429/252, 253, 254

[56] References Cited

U.S. PATENT DOCUMENTS 3,207,631 9/1965 Zaromb ................................ 429/59
3,877,985 4/1975 Rampel ................................ 429/59

Primary Examiner—Charles F. LeFevour
Attorney, Agent, or Firm—Frishauf, Holtz, Goodman & Woodward

[57] ABSTRACT

A non-gassing storage battery wherein oxygen is reduced at the negative electrodes submerged in the electrolyte. The storage battery consists of positive and negative electrodes separated from one another by separators, and of a liquid acidic or alkaline electrolyte. The separators are gas-permeable and have at least the upper peripheral region consisting of a micro-porous and gas-impermeable material in order to prevent escape of the oxygen into the gas chamber. The storage battery can be used primarily as a high performance storage battery, for example, as a starter battery in motor vehicles.

15 Claims, 9 Drawing Figures

U.S. Patent   Mar. 16, 1982   Sheet 3 of 3   4,320,181
FIG. 4.1
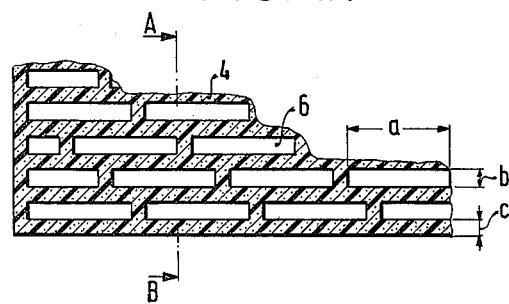
FIG. 4.2
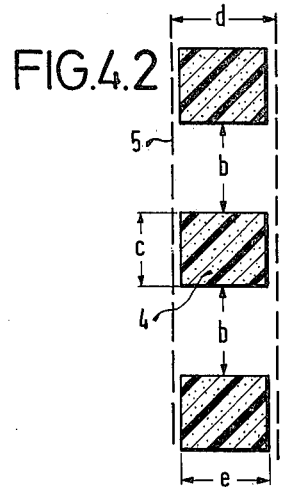
FIG. 5.1
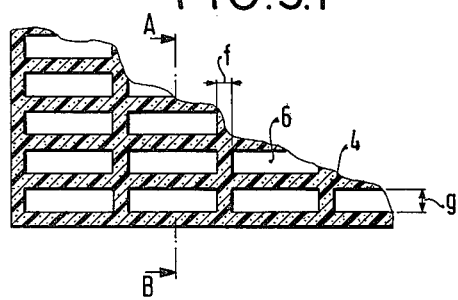
FIG. 5.2
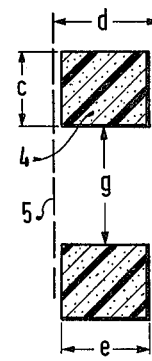
FIG. 6.1
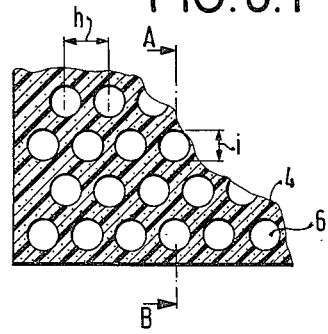
FIG. 6.2
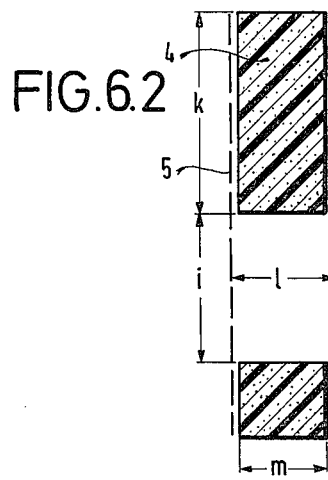

NON-GASSING STORAGE BATTERY

The invention relates to an improved non-gassing storage battery with positive and negative electrodes separated from one another by separators and with a liquid acidic or alkaline electrolyte.

BACKGROUND AND PRIOR ART

Due to the limited efficiency of the establishment of charge on battery electrodes, the charging process is always accompanied by side reactions, the most important being the decomposition of water combined with a gassing action. The differentiable charge efficiency of the positive and negative plates has the result that oxygen is generated very early, whereas hydrogen is principally set free only near the end of the charging process. This oxygen can be reduced not only at moist negative plates that are not covered by electrolyte; rather, the transformation proceeds better and more evenly at negative plates which are submerged in the liquid electrolyte. This fact, and the special charging behavior of battery electrodes, in particular with lead batteries having antimony-free or low-antimony plate grids, make possible a transformation of the oxygen at the negative electrodes independent of whether the electrolyte is liquid or fixed (bound or hindered) without having to enclose the battery gas tight, so that loss of water and gassing can be avoided. On this basis, it is known from the Austrian Patent Schrift OE-PS No. 259 654 to guide the oxygen accumulated in the gas chamber of the storage battery toward the lower end of the negative plates by means of a pump, so that the oxygen rises from within the electrolyte and is reduced upon contact with the negative plates and transformed into water. However, this collector is very expensive due to the necessity of providing a pump apparatus in the gas chamber of the storage battery; moreover, the overall height of the battery becomes greater, which is especially disadvantageous with starter batteries, for whose installation increasingly less space is available.

THE INVENTION

It is an object of the present invention to provide a non-gassing storage battery which may be compact, simple and economical in design and which has a long service life.

The improved non-gassing storage batteries of the present invention separate adjacent positive and negative electrodes by a separator which is gas-permeable and includes at least the upper peripheral region consisting of a micro-porous gas-impermeable material to prevent escape of oxygen gas into the gas chamber above the electrode structure. Preferably, the gas-permeable separators consist of a micro-porous material having a number of holes which are at least 3 mm in diameter. The gas-permeable separators may also consist of a frame subdivided by webs and comprises a micro-porous material.

In a preferred embodiment of the invention, the portion of the separator which is not the micro-porous material i.e. the area of the holes is between about 35% and 65% of the whole surface of the separator.

One or both sides of the separator facing the electrode surface or surfaces is covered by a thin, wide-mesh fabric or matted material which is gas-permeable and functions to prevent contact short-circuits between the electrodes. Preferably, said fabric or matted material consists of a synthetic material such as polypropylene, polyethylene, polyvinylchloride or fluorinated polyhydrocarbons or of glass fibres.

In the preferred embodiments of the invention, the micro-porous and gas-impermeable material consists of (i) diatomaceous earth or silica gel held together by a binder, (ii) micro-porous PVC layers or polypropylene layers, or (iii) phenol-resin impregnated paper.

In the particularly preferred embodiment of the present invention, the gas-permeable separator consists of a frame subdivided by means of webs and made of a micro-porous electrolyte-permeable material, and the separator has a thin, wide-mesh, gas-permeable fabric or matted material on both sides to prevent contact short-circuits.

The non-gassing storage battery according to the invention with positive and negative electrodes separated from one another by separators and having a liquid acidic or alkaline electrolyte, has the comparative advantage that it succeeds in a very simple manner in substantially preventing the gassing of a storage battery having liquid acidic or alkaline electrolyte, without materially altering the conventional configuration of the storage battery. Aside from the special embodiment of the separator, no further functionally dictated restrictions exist for the utilization of the apparatus according to the invention. Neither the behavior of the active materials nor the consistency of the electrolytes plays a decisive role therein, so that batteries in which liquid acid or liquid alkaline must be used due to reasons of performance can also be constructed in a non-gassing embodiment. Because the oxygen reaches the negative plates in a direct manner and not as in the known batteries via a gas chamber, a gas-tight cell closure and safety devices guarding against overpressure, such as pressure-sensitive switches or valves, are not required.

An effective reduction of the oxygen at the negative plates during charging brings still another advantage, especially with maintenance-free lead storage batteries having antimony-free grid plates. The generally better charging efficiency of the negative plates relative to the positive plates causes the negative plates to become fully charged before the positive plates. A complete charging of the positive plates is only possible with a sufficiently long charging, i.e., overcharging, of the negative plates with constant current. With constant voltage or with charge processes according to I/U, or falling characteristic curves, the charge head-start of the negative plates can in fact no longer be overcome because as soon as they are fully charged, they reduce the current conduction of the battery to such an extent due to the high hydrogen overvoltage that almost no further charge is accepted. The result is incompletely charged positive plates, which limit the battery capacity to an extent that is the greater the more often the battery was charged in this manner, until the charging efficiencies equalize due to the lower charge state of the positive plates. The equalization of the charging efficiencies takes place automatically in conventional storage batteries having antimony-containing grid plates by way of the progressive antimony contamination of the negative plates. In storage batteries having antimony-free grid plates, special provisions must be made for this purpose, primarily in order to get away from the positive limitation of capacity, which is detrimental to the service life expectancy of these storage batteries. In the storage batteries according to the invention, an adaptation of the differing charge efficiencies of the positive plates and negative plates is achieved via the oxygen reduction at the negative plates, and this is a prerequisite for a balanced utilization of the capacity of the plate material. A further improvement achieved in the case of the lead storage battery by means of the invention is the fact that battery failures caused by short-circuiting, which represent a very frequent failure source of maintenance-free lead batteries, are essentially prevented, whereby their useful life can be appreciably lengthened. An important reason for short circuits caused by formation of sponge deposits or formation of dendrites in maintenance-free lead batteries is clearly the very low negative electrode potential caused by the high hydrogen overvoltage; this low negative electrode potential is present toward the end of the charging process at a constant magnitude and causes lead deposition distinguished by a directional growth pattern toward the other polarity and appearing mainly at exposed locations of high current density and overvoltage. Because this involves primarily plate edges and plate corners, even generously protruding separators do not represent an effective protection against short-circuits of this type. By comparison, as battery research has shown, the negative potential is elevated to such an extent with oxygen reduction that lead precipitation leading to short-circuits no longer takes place. It was achieved primarily by these means that the incremental cyclic useful life of maintenance-free starter batteries of approximately 20 low-current discharges was more than doubled.

THE DRAWINGS

DETAILED DESCRIPTION

Figure 1:
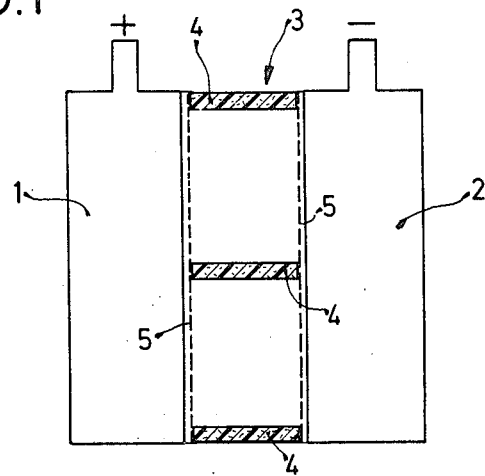
FIG. 1 is a schematic cross-section through a single cell.

The cell consists of a positive lead dioxide electrode 1, of a negative lead electrode 2, as well as the gas-permeable separator 3 located between these electrodes. The electrodes and the separator are submerged in a liquid sulfuric acid electrolyte not shown here. The separator consists of a frame of a micro-porous polypropylene fiber material, of which only the horizontal webs 4 are depicted in the sectional view of FIG. 1. To prevent contact short-circuits, wide-meshed glass felted or woven fabric 5 having a thickness of about 0.1 mm to 0.3 mm is attached at both sides of the separator 3, and these do not hinder the passage of oxygen.

The oxygen generated at the electrode 1 during the charging and overcharging of the cell travels partly in physically dissolved form by diffusion and partly in the shape of very small gas bubbles of approximately 50 $\mu$m to 100 $\mu$m by convection directly to the adjacent electrode 2, where this oxygen is reduced and once again transformed into water. The separator must therefore be so constructed and so disposed within the battery as to permit the movement of oxygen on both paths unhindered and loss free; i.e., such as to prevent an escape of the oxygen into the gas chamber through the micro-porous frame. A gas-tight enclosing of the battery is consequently also not necessary. So as not to impair the conductivity and the electro-chemical charge and discharge reactions, all of the component parts of the separator should, however, be sufficiently electrolyte-permeable.

With the utilization of separators having high acid retention capability, it is also possible to confine the electrolyte between the plates and to operate the battery independent of the position of the battery, i.e., upright, on its side, or even inverted.

Commercially available micro-porous separators having pore widths under 50 $\mu$m (microns) are not suited to this purpose due to their being only slightly permeable to oxygen. Because in this case the oxygen can reach the negative electrodes which are immersed in acid or in the alkaline only via the gas chamber after renewed dissolution in the catholyte, its electro-chemical transformation in batteries having liquid acid is not possible when such separators are used. Negative electrodes which protrude out of the electrolyte do admittedly improve the gas absorption, but they have the disadvantage that the full capacity of the negative plates is no longer available.

Figure 2:
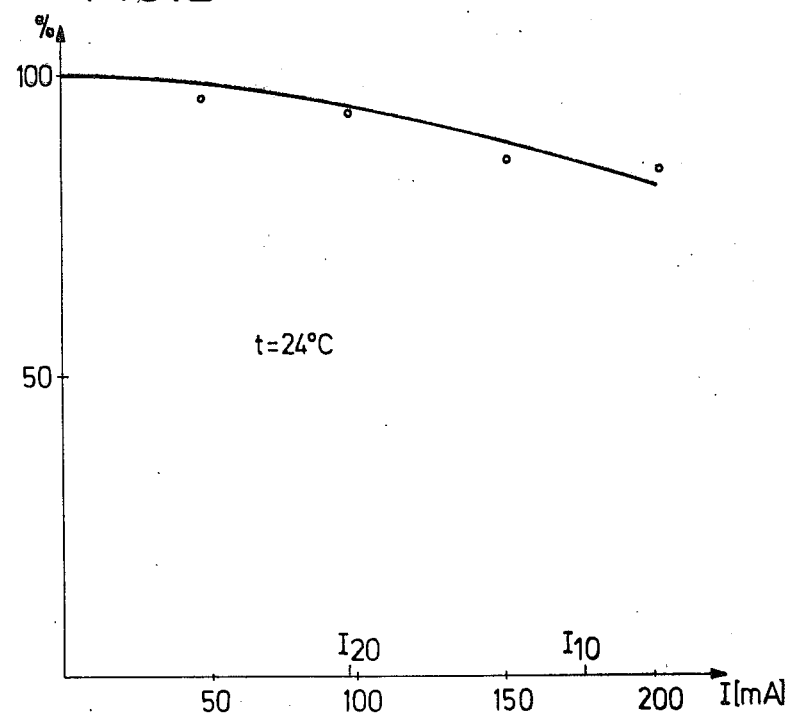
FIG. 2 depicts the gas absorption in percent as a function dependent on the charge current.

In FIG. 2, the gas absorption is depicted as a function of the charging current during constant overcharging of lead battery cells according to the invention, which were equipped with a frame separator subdivided by means of webs. It was shown that at a charging current $I_{20}$ approximately 95% of the oxygen is recombined, whereas at a 10-hour charge current $I_{10}$, approximately 90% are still transformed; these data were obtained at a temperature of 24 degrees centigrade (C.).

Figure 3:
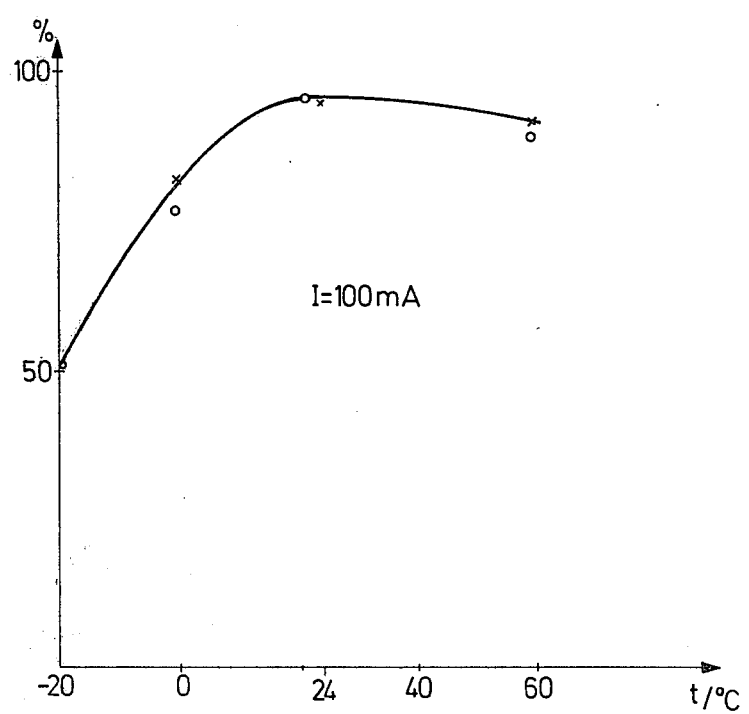
FIG. 3 depicts the gas absorption in percent as a function dependent on the temperature.

FIG. 3 depicts the gas absorption in percent as a function of the temperature at a charge current of 100 mA. At a temperature of $-20$ degrees C., 50% of the oxygen is still being recombined; thereafter, this value increases rapidly with rising temperature and reaches the maximum value of approximately 95% at approximately 24 degrees C.; at even greater temperature, it merely decreases slightly. These results were obtained for the most part from gas measurements at battery cells constructed of antimony-free material. Experiments with cells containing low-antimony grid compositions having an antimony content of under 3.5% nevertheless produced quite similar results.

The further drawings show different examples of the separator showing only a cutaway portion of the whole separator.

FIGS. 4.1 and 4.2 show a separator with irregular rectangular apertures;

FIGS. 5.1 and 5.2 show a separator with a regular rectangular arrangement of the apertures; and FIGS. 6.1 and 6.2 show a separator with round holes.

FIGS. 4.1, 5.1 and 6.1 are topviews and FIGS. 4.2, 5.2 and 6.2 are cross sections along the lines AB of the FIGS. 4.1, 5.1 and 6.1 in a fivefold scale.

The separator shown in FIGS. 4.1 and 4.2 is the best mode. The apertures 6 in the microporous material 4, consisting of commercially available diatomaceous earth bound together by a binder as described in the U.S. Pat. No. 3,753,784, are horizontally arranged and each row of apertures is shifted against the next. The ratio of the length to the height of the apertures is from 2 to 10 with an absolute height from 2 to 6 mm. In addition FIG. 4.2 shows the fabric 5 made of a glass fibre mat. The special dimensions of the separator shown in FIGS. 4.1 and 4.2 are: a=18 mm; b=3.0 mm; c=2.5 mm; d=2.0 mm and e=1.6 mm.

The apertures 6 of the separator shown in FIGS. 5.1 and 5.2 are arranged in a regular manner. The microporous material 4 consists of commercially available microporous PVC layers or polypropylene layers. The fabric 5 (FIG. 5.2) consists of a polypropylene fibre mat. The special dimensions as far as they differ from those of FIGS. 4.1 and 4.2 are: f=2.5 mm; g=4.0 mm.

The apertures 6 of the separator shown in FIGS. 6.1 and 6.2 have the form of round holes. The microporous material 4 is a commercially available phenol-resin impregnated paper, whereas the fabric 5 (FIG. 6.2) consists of a polyethylene fibre mat. The diameters of the holes may vary between 3 and 15 mm and the bridge between two holes should be between 2 and 7 mm. The special dimensions in FIGS. 6.1 and 6.2 are: h=7.0 mm; i=5.0 mm; k=7.1 mm; l=1.8 mm and m=1.5 mm.

All components of the separator have to be permeable to the electrolyte for not affecting the flow of current as well as the electrochemical battery reactions which would decrease the power and the capacity of the battery. For this reason the material 4 of which the separator 3 is made must be microporous because only such a material has a sufficient permeability to liquids such as the electrolyte and only a low permeability to gases if the microporous material is wet.

The thin, wide-mesh fabric or matted material must not have holes or a mesh size of more than 300 $\mu$m in order to effectively preventing contact short-circuits between the electrodes.

The apertures or holes 6 in the microporous material 4 should be dimensioned in number and size in such a way that a uniform flow of oxygen all over the surface of the plates is achieved because only under these circumstances the oxygen is transformed rapidly and completely. The occurrence of larger gas bubbles must be avoided.

The microporous parts of the separator 3, e.g. the webs 4 are 1 to 2 mm thick, whereas the fabric 5 is much more thinner (0.1 to 0.3 mm) for not hindering the gas passage in a too large extent. The overall dimensions of the separator depend from the dimensions of the batteries which can differ largely from type to type.

In FIG. 2 $I_{10}$ and $I_{20}$ are the 10 hours and 20 hours charging currents having a direct relationship to the 10 hours and 20 hours nominal capacity $K_{10}$ and $K_{20}$. The relationship can be formulated by: $I_{10}=0.1 \cdot K_{10}$ and $I_{20}=0.05 \cdot K_{20}$.

We claim:

1. A non-gassing storage battery comprising alternating positive and negative electrodes separated from one another by separators and having a liquid acidic or alkaline electrolyte, the improvement comprising said separators being gas-permeable and having at least the upper peripheral region consisting of a micro-porous gas-impermeable material.

2. The storage battery of claim 1, wherein said gas-permeable separators consist of a micro-porous material having a number of holes of at least 3 mm in diameter.

3. The storage battery of claim 2, wherein the separator, on one side or both sides, is covered with a thin, wide-meshed, and gas-permeable matted or woven fabric which prevents contact short-circuits between electrodes.

4. The storage battery of claim 3, wherein said fabric consists of a synthetic material or of glass fibers.

5. The storage battery of claim 1, wherein said gas-permeable separators consist of a frame subdivided by webs and made of a micro-porous material.

6. The storage battery of claim 5, wherein the separator, on one side or both sides, is covered with a thin, wide-meshed, and gas-permeable matted or woven fabric which prevents contact-short-circuits between electrodes.

7. The storage battery of any one of claims 1, 2 or 5, wherein said separator contains holes so that oxygen can pass through the separator, said holes comprising between 35% and 65% of the whole separator surface and micro-porous gas-impermeable material comprises substantially the remainder of said separator surface.

8. The storage battery of claim 7, wherein the microporous and gas-impermeable material consists of a material selected from the group consisting of (i) diatomaceous earth or silica gel bound together by a binder, (ii) micro-porous PVC layers or polypropylene layers, and phenol-resin impregnated paper.

9. The storage battery of claim 8, wherein the separator, on one side or both sides, is covered with a thin, wide-meshed, and gas-permeable matted or woven fabric which prevents contact short-circuits between electrodes.

10. The storage battery of claim 9, wherein said fabric consists of a synthetic material or of glass-fibers.

11. The storage battery of claim 8 wherein said separators comprise micro-porous gas-impermeable material having the micropores thereof filled with electrolyte and containing holes through said separators for passage of oxygen except in the upper peripheral region thereof.

12. The storage battery of any one of claims 1, 2 or 5, wherein the micro-porous and gas-impermeable materials consists of a material selected from the group consisting of (i) diatomaceous earth or silica gel bound together by a binder, (ii) micro-porous PVC layers or polypropylene layers and (iii) phenol-resin impregnated paper.

13. The storage battery of claim 12 wherein said separators comprise micro-porous gas-impermeable material having the micropores thereof filled with electrolyte and containing holes through said separators for passage of oxygen except in the upper peripheral region thereof.

14. The storage battery of claim 1 or 3 wherein said separators comprise micro-porous gas-impermeable material having the micropores thereof filled with electrolyte and containing holes through said separators for passage of oxygen except in the upper peripheral region thereof.

15. The storage battery of claim 14 wherein said surface area of said holes is between 35% and 65% of the total surface area of said separator surface containing said holes and said micro-porous gas-impermeable material comprises substantially the remainder of said separator surface.

* * * * *